United States Patent [19]
Lecourtier

[11] Patent Number: 5,745,757
[45] Date of Patent: Apr. 28, 1998

[54] MULTIPROCESSOR SYSTEM WITH MICROPROGRAMMED MEANS FOR DISPATCHING PROCESSES TO PROCESSORS

[75] Inventor: Georges Lecourtier, Versailles, France

[73] Assignee: Bull S.A., Paris, France

[21] Appl. No.: 441,648

[22] Filed: May 15, 1995

Related U.S. Application Data

[63] Continuation of Ser. No. 964,292, Oct. 21, 1992, abandoned.

[30] Foreign Application Priority Data

Oct. 30, 1991 [FR] France ................... 91 13431

[51] Int. Cl.⁶ ............................................... G06F 9/46
[52] U.S. Cl. ................... 395/672; 395/800; 395/673; 395/200.03
[58] Field of Search .................. 395/650, 800, 395/678, 670, 672, 673, 674, 200.03

[56] References Cited

U.S. PATENT DOCUMENTS

| | | | |
|---|---|---|---|
| 4,286,322 | 8/1981 | Hoffman et al. | 395/650 |
| 4,318,173 | 3/1982 | Freedman et al. | |
| 4,394,727 | 7/1983 | Hoffman et al. | 395/650 |
| 4,590,550 | 5/1986 | Eilert et al. | 395/575 |
| 4,590,555 | 5/1986 | Bourrez | 395/650 |
| 4,914,570 | 4/1990 | Peacock | 395/650 |
| 4,965,716 | 10/1990 | Sweeney | 395/650 |
| 5,179,702 | 1/1993 | Spix et al. | 395/650 |
| 5,202,989 | 4/1993 | Hirosawa et al. | 395/650 |
| 5,293,620 | 3/1994 | Barabash et al. | 395/650 |
| 5,452,452 | 9/1995 | Gaetner et al. | 395/350 |

FOREIGN PATENT DOCUMENTS 0064142  11/1982  European Pat. Off.

OTHER PUBLICATIONS

IBM Tech. Discl. Bul., vol. 26, No. 6, Nov. 1983; "Task Scheduling on a Multilevel Multiprocessor", p. 2821.
Schwan et al, "Adaptive, Reliable Software for Distributed and Parallel Real–Time Systems", Sixth Symposium on Reliablity in Distributed Software and Database Systems, IEEE, Mar. 1987, pp. 32–42.
Ghafoor et al, "An Efficient Model of Dynamic Task Scheduling for Distributed Systems," IEEE, 1990, pp. 442–447.

*Primary Examiner*—Larry D. Donaghue
*Attorney, Agent, or Firm*—Kerkam, Stowell, Kondracki & Clarke, P.C.; Edward J. Kondracki

[57] ABSTRACT

In a multiprocessor system, events capable of modifying the dispatching of processes to the processors (CPU, CPUi) start the execution of dispatching software charged with defining the new dispatching as a function of events and various data. When the number of processors (CPU, CPUi) is large, the microsoftware must be optimized. To that end, the microsoftware is subdivided into a plurality of specialized microprogram modules for determining the dispatching in response to respective categories of particular events. A central microprogram module takes into account the events other than those processed by the specialized modules.

20 Claims, 7 Drawing Sheets

| 0 | PL | 16 | 18 | 24 | 28 | 31 |
|---|---|---|---|---|---|---|
| NL | | R | D | TEN | PRI | |
| JP | | | | | | |

FIG. 4

| 0 | 4 | SEM | 16 | 31 |
|---|---|---|---|---|
| STAG | SMC | | SCT | |
| PQHP/MQHP | | | MQTP | |

FIG. 5

| 0 | ML | 16 | 24 | 28 | 31 |
|---|---|---|---|---|---|
| NL | | | | MPL | MTAG |
| SENDER | | | | | |

FIG. 6

| 0 | SCB | 31 |
|---|---|---|
| RDYLK | | |
| | | CST |
| MPDL | | |
| SEMLK | | |
| VLD-CPU-MSK | | |
| IDLE-CPU-MSK | | |

FIG. 7

MULTIPROCESSOR SYSTEM WITH MICROPROGRAMMED MEANS FOR DISPATCHING PROCESSES TO PROCESSORS

This is a Continuation of application Ser. No. 07/964, 292, filed Oct. 21, 1992 now abandoned.

The invention is in the field of information processing systems of the multiprocessor type, and more particularly relates to the mechanisms employed to assure dynamic dispatching of processes to the processors in such a system.

The distribution of processes to the processors (typically called "dispatching") is an operation whose use has great influence on system performance, especially for applications of the transactional type. The influence of the dispatching on performance is especially sensitive if the number of system processors becomes large, because the average frequency of events that can trigger dispatching rises in proportion to the number of processors. Dispatching is an operation that is triggered by any event capable of causing a modification in the selection of processes that are to be executed. Most frequently, these events result from synchronizing operations among processes, and the processes may be those that run the applications programs or operating system programs, such as input/output programs. There may also be other types of events linked with a change in state of a processor, for instance, or in the particular instructions that introduce or delete a process to or from the system or modify the level of priority of one of the processes. The appearance of such an event will accordingly have the effect of activating system microprograms charged with determining the new allocation of the processes to the processors as a function of the event and of various criteria, for example taking the order of priority of the processes that are ready to be run into account.

In the case of microprogrammed employment, dispatching is done in two phases. A first selection phase, corresponding to the execution of a first microprogrammed module called "SELECT", is provided to make the selection of processes to be run and processors that are to run them. This selection phase is accompanied by the sending of interruptions serving to inform the processors involved of new processes to be run. The reception of these interruptions by the processors addressed triggers an execution phase in them, essentially consisting of saving the contexts of the processes whose execution is being interrupted and loading the contexts of the new processes to be run into the processors. This execution phase corresponds to parallel execution by the processors involved of microprogrammed modules called "EXEC".

To improve the response time of the system to events that trigger dispatching, it is desirable for the selection operation to be capable of being done in decentralized fashion, which requires that all the processors of the system, or at least several of them, each be capable of performing the selection operation. This problem was the subject of U.S. Pat. No. 4,590,555, issued on May 20, 1986, corresponding to European Patent EP-B1 30 504, and is hereby incorporated by reference into the present specification. This patent addressed in particular the problem associated with possible conflicts among a plurality of processors each seeking to execute the selection operation. These conflicts absolutely must be avoided, because the selection operation manipulates system data, such as the state of the processes and processors, that must continue to have the same value for the entire system. To that end, locks are provided in particular; in other words, indicator means are provided that are activated and maintained by the processor executing dispatching, to prevent some other processor from running a new selection phase before the prior dispatching has been completely finished.

The object of the invention is to propose an optimized embodiment of the aforementioned dispatching, in such a way that increasing the number of processors does not cause a relative lowering of system performance.

This search for optimization has involved statistical analysis of the various types of dispatching executed in a multiprocessor system. For transactional applications, this analysis has made it possible to confirm that in approximately 75% of the cases, the dispatching operations had the effect in the final analysis either of causing no modification in the selection of processes executed or of interrupting the execution of only a single process and generally replacing it with another. These frequent dispatching cases are accordingly, a priori, the simplest to be processed, yet there was a need to discover means to exploit this situation, so that system coherence can be preserved under all circumstances.

Secondly, two resource categories involved in the selection operations can be distinguished. The first category includes information relating to the state of the processes constituted in the system, which are typically physically embodied by process queues. Process queues generally exist, associated with events. Each queue contains the identity of all the processes whose execution has been interrupted to wait for the appearance of an event or an associated message. On the other hand, at least one queue exists that includes the processes being run and the processes ready to be run, that is, the processes that cannot be run for lack of available processors. A second category of resources includes dialog means that enable communication among the processors. These means are generally embodied by an interruption mechanism associated with data exchange zones, called mailboxes, which in particular enable the processor that is running the selection operation to inform the addressee processors of new processes to be run.

More detailed analysis of the circumstances that lead to the most frequent dispatching cases confirms that quite often, only some of the resources mentioned above are used. In fact, if the event capable of triggering dispatching consists in the notification of an event or message, by a process being run, then two cases can occur. In a first case, no process is waiting for that event. The processor generating the event can in the majority of cases update a data structure of the semaphore type, to indicate that the event has occurred. This processor can then continue executing the process that it was executing before, and no modification whatever occurs in the dispatching of processes to the processors of the system. In that case, only the data structure associated with the semaphore is involved. In the other case, at least one process is waiting for this event. The process with the highest priority in the queue will then be extracted from that queue and inserted into the queue of the ready processes, and depending on the level of priority of this process, it is possible that it would have to replace an active process in one of the processors of the system. The resources involved in this operation will then be the data structure and the queue of the processes associated with the semaphore, the queue of the ready or active processes, and optionally the dialog means among processors, if the process that was waiting has to replace a process that was active in a different processor.

In the complementary case where an active process must inquire whether an event has occurred or a message is present in order to be capable of continuing its execution is taken as another example, then once again two cases are distinguished. In a first case, notice of the event or message has already been given, which is verified by the processor by accessing the data structures associated with the semaphore. The process can then continue its execution. In the second case, notice of the event or message has not been given and execution of the process must be interrupted. In that case, the process with the highest priority in the queue of ready processes takes the place of the process executed beforehand by the processor. In terms of the use of resources, it is seen that in the first case, only the data structure associated with the semaphore is involved, while in the second case the queue of ready processes is also involved. The dialog means, contrarily, are not used in either of these cases.

On the basis of some of the above examples in a particular context, it can be confirmed more generally that the operation of dispatching processes to the processors can be broken down into a plurality of simpler operations, each corresponding to one category of particular events or situations, which in fact require the use of only some of the set of resources that may be involved in a dispatching operation.

Accordingly, the object of the invention is to seek to exploit the above observations with a view to increasing the possibilities for parallelization of certain phases in dispatching. However, the embodiments proposed should suitably also be reliable in function and simple to use. This object may be attained by subdividing the software charged with dispatching, this subdivision being selected in such a way as to define at least one specialized module belonging to one category or set of events that cause the same types of modifications in dispatching processes to the processors, which means that the same types of resources will be used. By providing a plurality of modules of this type, the result is an increased probability that a plurality of modules will be executable simultaneously without the risk of conflict in terms of system resources.

It is also suitable to provide a particular module to take events that do not fit into categories into account, that is, those that cannot be processed by the specialized modules.

More precisely, the subject of the invention is a multi-processor information processing system, a plurality of whose processors are each provided with microprogrammed means to perform the dispatching of processes to the processors of the system, the microprogrammed means being activated in a processor in response to any event detected by the processor and capable of causing a modification in the selection of processes that are to be run and of processors that run them, the system being characterized in that the microprogrammed means include at least one specialized microprogram module capable of determining the dispatching in response to a category of particular events and central microprogram module capable of determining the dispatching for events other than those processed by the specialized modules.

For better exploitation of the invention from the standpoint of system performance, and in an additional characteristic of the invention, the categories of particular events include events among those that have the strongest probability of occurring in the course of system operation.

To reinforce the possibilities for parallelization and in another characteristic of the invention, each category of particular events includes events that cause simple modifications in the selection of processes that are to be run and processors that run them.

The subject of the invention is also a particular embodiment of the system, given that the state of the processes that can be run in the system is memorized either in a queue of the processes waiting for an event, or in one queue of ready, or in other words active, processes in a processor or waiting for a processor, the categories of events include the events capable of causing an addition, subtraction or displacement, respectively, of a single process JP in the queue of ready processes.

The specialized modules may be designed so as to perform the dispatching corresponding to the associated events completely and under all circumstances. However, that would require increasing the complexity of the modules and increased size for the microprogram's memories. To avoid this disadvantage, and in accordance with a variant embodiment of the invention, each specialized module is provided for completely executing the selection operation, outside certain predefined cases that will preferably correspond to atypical and complex situations, such as in the presence of conflicts between concurrent dispatching operations, in a plurality of processors. Each specialized module is provided for detecting these cases and making the call to the central module. The central module will accordingly also be designed so as to integrally process all these atypical cases excluded from processing by the specialized modules.

Accordingly, in a particular embodiment, the system according to the invention includes means of dialog between processes used as applicable by the microprogrammed means of a processor in order to issue requests notifying other processors of the identity of new processes NJP to be run. On the other hand, these dialog means are associated with a first dialog lock used by the microprogrammed means to assure that only one processor at a time will issue the requests. Each specialized module, finally, is designed so as to stop its execution and make the call to the central module in the event that the execution of the specialized module involves a dialog while the lock is engaged.

Further aspects and details of embodiment will be explained in further detail in the ensuing description.

FIG. 4 shows the format of a process link used in the various process queues.

FIG. 5 shows the format of a semaphore.

FIG. 6 shows the format of a message link serving to form the message queue associated with a semaphore.

FIG. 7 shows the format of the system control block containing the system data used during dispatching operations.

Figure 1:
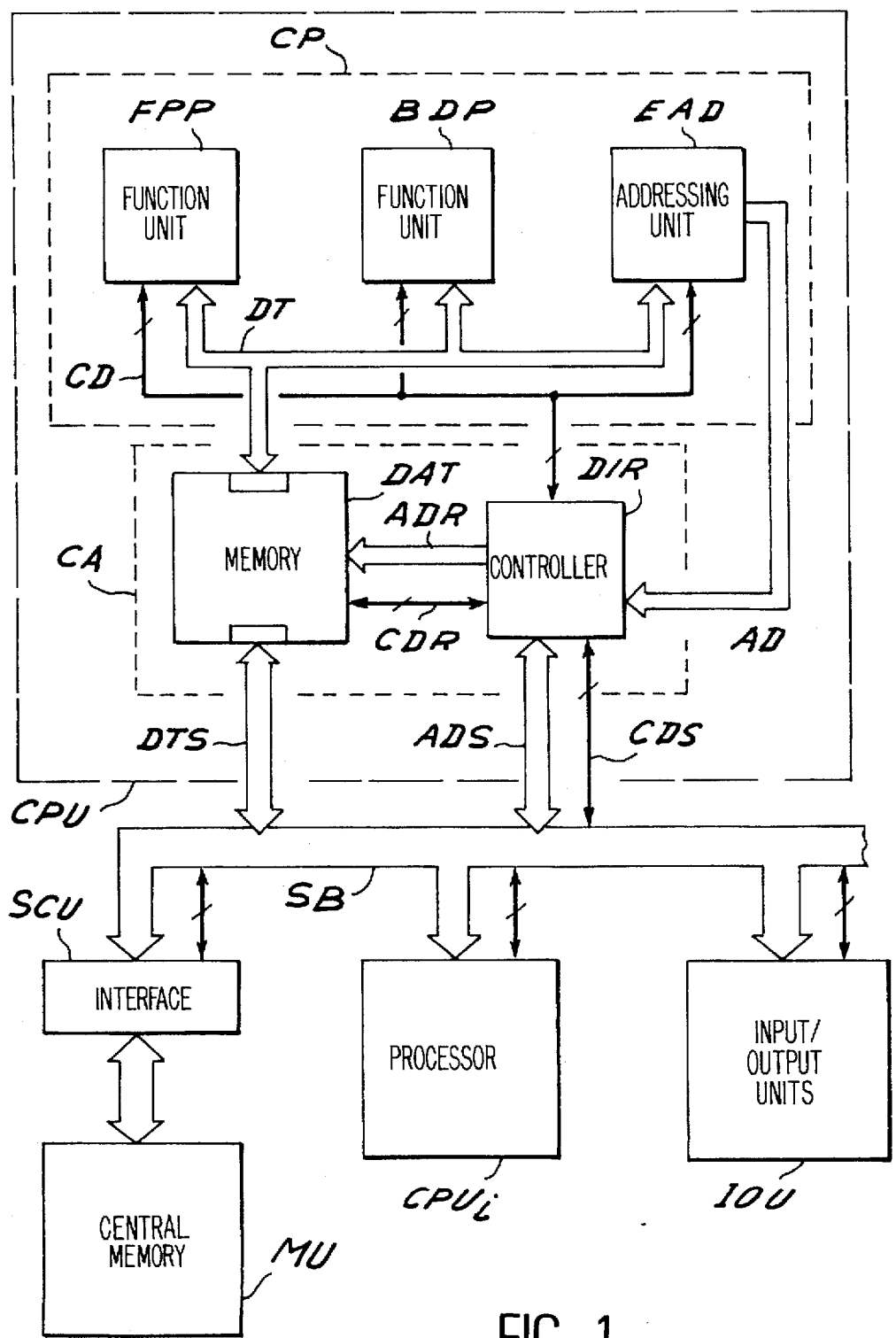
FIG. 1 shows the central subsystem of an information processing system for using the invention.

The system shown in FIG. 1 constitutes what is called a central subsystem of an information processing system. It is composed of a plurality of processors CPU, CPUi connected to a system bus SB in such a way as to be capable of communication with one another and with a central memory MU and input/output units IOU. The input/output units IOU enable the central subsystem to communicate with peripheral subsystems (not shown).

The central memory MU may be embodied by means of a plurality of memory modules or cards connected to the system bus SB by way of an interface circuit SCU that plays the role of both memory controller and controller of the bus SB. In the conventional way, the bus SB is constituted by a data bus DTS, an address bus ADS and command and control lines CDS.

Each processor CPU essentially includes microprogrammed processing means CB and a cache memory CA serving as an interface with the system bus SB. The cache memory CA is composed of memory circuits DAT connected to the data bus DTS, and a controller DIR connected to the address bus ADS and to the control lines CDS. The processing means CP include a plurality of function units EAD, BDP, FPP, assigned to specific respective functions. In particular, the unit EAD is an addressing unit connected to the controller DIR via address lines EAD. The units EAD, BDP, FPP are also connected to the memory circuits DAT via an internal data bus DT and to the controller DIR via the internal command and control lines CD.

The controller DIR controls the reading and writing operations of the memory circuits DAT via the address and control lines ADR and CDR, respectively. It also serves to control the reading and writing operations of the central memory MU, in order to make the data transfers between the memory MU and the memory circuits DAT. Finally, in the embodiment shown, the controller DIR also includes the interface circuits serving the purpose of exchanges of messages (such as requests and acknowledgements) between the processor CPU and the other processors CPUi or with the input-output units IOU.

The detailed embodiment of the functional units of the processor CPU is described in European Patent Application EP-A 434 483, published on Jun. 26, 1991, under the title "Processeur à plusieurs unités de traitement microgrammées" [Processor with Multiple Microprogrammed Processing Units] corresponding to U.S. Ser. No. 07/620,130, DOLIDON et al., filed on Nov. 30, 1990, the subject matter of which is hereby incorporated by reference.

Furthermore, the means that enable the dialogs between the processors CPU, CPUi of the system may be embodied according to French Patent Application 90.06948, filed on Jun. 5, 1990, under the title "Procédé, de dialogue entre les processeurs d'un système, système pour sa mise en ouvre et utilization pour la répartition des processus aux processeurs" [Method for Dialog Between the Processors of a System, System for Its Employment, and Use for Dispatching and allowed on Aug. 28, 1992, under No. 2,662,830. This application corresponds to U.S. Ser. No. 07/710,340, CASSONNET et al., filed Jun. 5, 1991, the subject matter of which is hereby incorporated by reference.

With respect to the general function of the system of FIG. 1, it is appropriate to turn to the aforementioned patent applications, which are incorporated herein by reference.

In this context, the invention may be employed by means of specific microprogram means that are part of the system microsoftware. These microprograms are provided to cooperate with the microsoftware module called "the interruption manager", which serves to select the modules to be run as a function of a certain number of indicators representative of events capable of being taken into account by the system. The specific microprograms that enable the employment of the invention will be described in conjunction with FIGS. 8–11, but some specific comments on the system resources manipulated by these microprograms should be made first.

Figure 2:
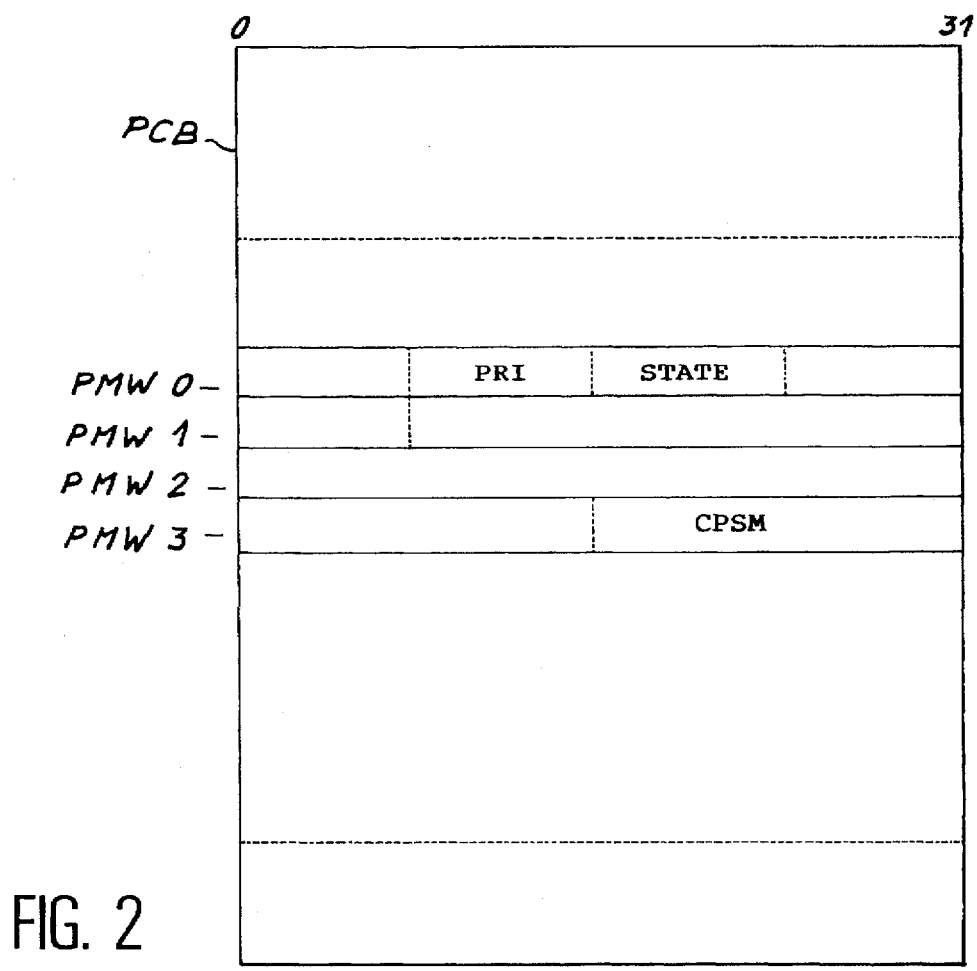
FIG. 2 shows the format of a process control block used in the dispatching operations.

FIG. 2 shows a data structure known as a "process control block" PCB associated with which process constituted in the system. This block is a memory zone constituted by a certain number of 32-bit words, containing all the information relating to the process and useful to the system. Only the information involved in employing the invention has been shown. Among this information, in the word PMW0, a field PRI representing the priority level of the process and a field STATE indicating the state of the process can be found. The value assumed by this field STATE indicates in particular whether the process is active or is ready and waiting for a free processor, or is waiting for an event. The word PMW2 is assigned to the address of the semaphore in the case where the process is waiting for an event associated with that semaphore. The field CPSM of the word PMW3 is a mask whose binary profile defines the system processors authorized to execute the process. A set of words called "zone registers" serve to save the context of the process, or in other words, the content of the registers of the processor that had executed the process the last time, just before its execution was interrupted.

Figure 3:
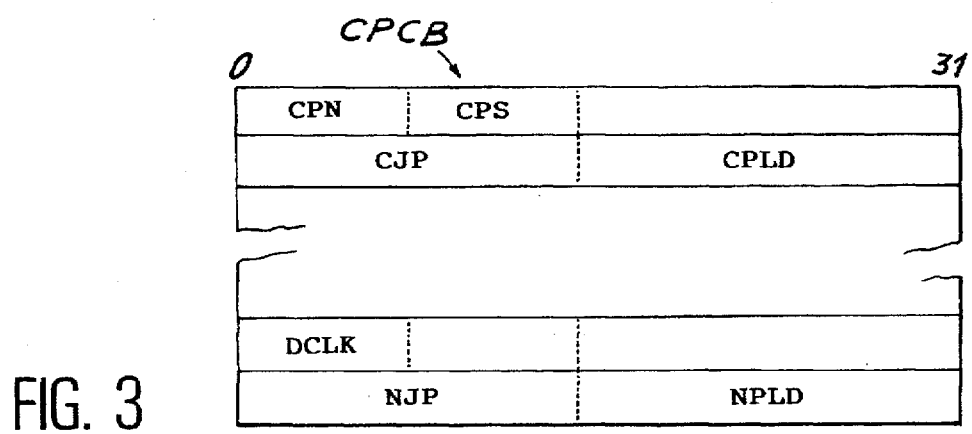
FIG. 3 shows the format of a processor control block.

FIG. 3 shows a memory zone associated with each processor, called "processor control block" CPCB and serving as a mailbox for the exchanges of information between a sender processor and the addressee processor associated with that block.

The block CPCB includes a field CPN containing the processor number, a field CPS indicating the processor state, a field CJP containing the number of the process being run in the processor, a field CPLD representing the address of the link of this process in the queue of ready processes Q/PR/RDY, a field NJP indicating the number of the new process that the processor is to execute, and a field NPLD indicating the address of the link of that process.

The block CPCB also contains a digital indicator DCLK serving as a lock and whose logical state that signals whether or not the mailbox is occupied.

We will now describe the resources making it possible to define the process queues. All of these elements have already been the subject of detailed description in the aforementioned U.S. Pat. No. 4,590,555 and in U.S. Pat. No. 4,395, 797 issued Jul. 26, 1983, and entitled "semaphore device for computer". Hence, we will recall only briefly the essential elements involved in the present invention.

As we have already indicated above, a distinction is made between two process queue categories: the queue of ready processes Q/PR/RDY and the queue or queues of processes waiting for an event. These queues are physically embodied by a set of data structures known as "links", each link being associated with one particular process.

FIG. 4 shows a format example for such a link PL. This link is composed of two 32-bit words, including a plurality of fields having the following meanings:

NL is a pointer representing the address of the next link in the queue;

JP is the identity of the process associated with the link;

R is a bit representing the state of the associated process;

D is an auxiliary bit which is the copy of the lock DCLK for facilitating execution of the dispatching;

TEN is the identity of the processor executing the process or that executed the process the last time;

PRI corresponds to the priority level of the process.

Access to a queue may be done by means of a pointer representing the address of the first link in the queue, in other words, the link associated with the oldest process in the queue. When a link is removed from the queue, the pointer assumes the value contained in the field NL of this link. When a link is added, the field NL of the last link assumes a value corresponding to the address of this new link.

By the particular embodiment used in the context of the invention, a single queue Q/PR/RDY is provided, which combines the ready, active processes and the ready, nonactive processes. The logical value of the bit R then makes it possible to distinguish whether the process is active (R=1) or not (R=0).

As to the processes waiting for events, queues are also used, whose links have the format shown in FIG. 4. Each queue Q/PR/S is associated with a data structure known as a "semaphore", and each semaphore is associated with a particular type of event.

It may also be provided that certain semaphores can be associated with message queues Q/M/S physically embodied by message links such as those shown in FIG. 6.

The format of a semaphore SEM is shown in FIG. 5.

It is formed of two 32-bit words including a plurality of fields having the following meanings:

STAG indicates the type of semaphore, depending on whether or not it can be associated with a message queue;

SMC indicates the maximum number of processes or messages that the associated queue can contain;

SCT is an algebraic number whose absolute value indicates the number of processes or messages contained in the queue and whose sign indicates whether it refers to processes or messages;

PQHP/MQHP is a pointer representing the address of the first process or message link in the queue;

MQTP is a pointer indicating the address of the last process or message link in the queue.

The format of a message link ML is shown in FIG. 6. It includes a plurality of fields having the following meanings:

NL is a pointer representing the address of the next message link;

SENDER is the identity of the process that is the sender of the message;

MPL corresponds to the message priority level;

MTAG is an indicator defining the type of message;

MESSAGE is the zone reserved for the message itself.

There is also a particular semaphore enabling management of a queue of processes waiting for a free message link or a queue of free message links, and a semaphore managing a queue of free process links.

U.S. Pat. No. 4,395,757 describes how the semaphores are used for synchronizing processes. We will accordingly not describe these operations in detail, but it is appropriate to recall that they are brought about by P- or V-type instructions, with the respective effect of decrementing or incrementing the counter SCT of the semaphore, which initially is at zero. Hence a positive SCT count means that at least one process has already given notice of an event or message associated with the semaphore. Contrarily, a negative SCT count indicates that at least one process is waiting for an event or a message associated with the semaphore. We will see more precisely with reference to FIGS. 8-11 how the P and V instructions proceed in the context of the invention.

FIG. 7 shows a different data structure, called "system control block" SCB, which joins together all the data useful to the system for its management. In particular, it includes particular fields used at the time of dispatching operations. These fields have the following meanings:

RDYLK is a lock associated with the ready processes queue Q/PR/RDY;

CST contains the value of a constraint counter indicating the number of processes constituted in the system that are to be run by particular processors;

MPDL is a lock for dialog between processors;

SEMLK is a set of locks associated with semaphores or groups of semaphores, respectively;

VLD-CPU-MSK is a mask whose digital profile makes it possible to determine the valid processors of the system;

IDLE-CPU-MSK is a mask whose digital profile enables determining the inactive processors in the system.

We will now show how the invention may be used in the case of two particular examples, that is, the P- and V-type instructions for semaphores.

Figure 8:
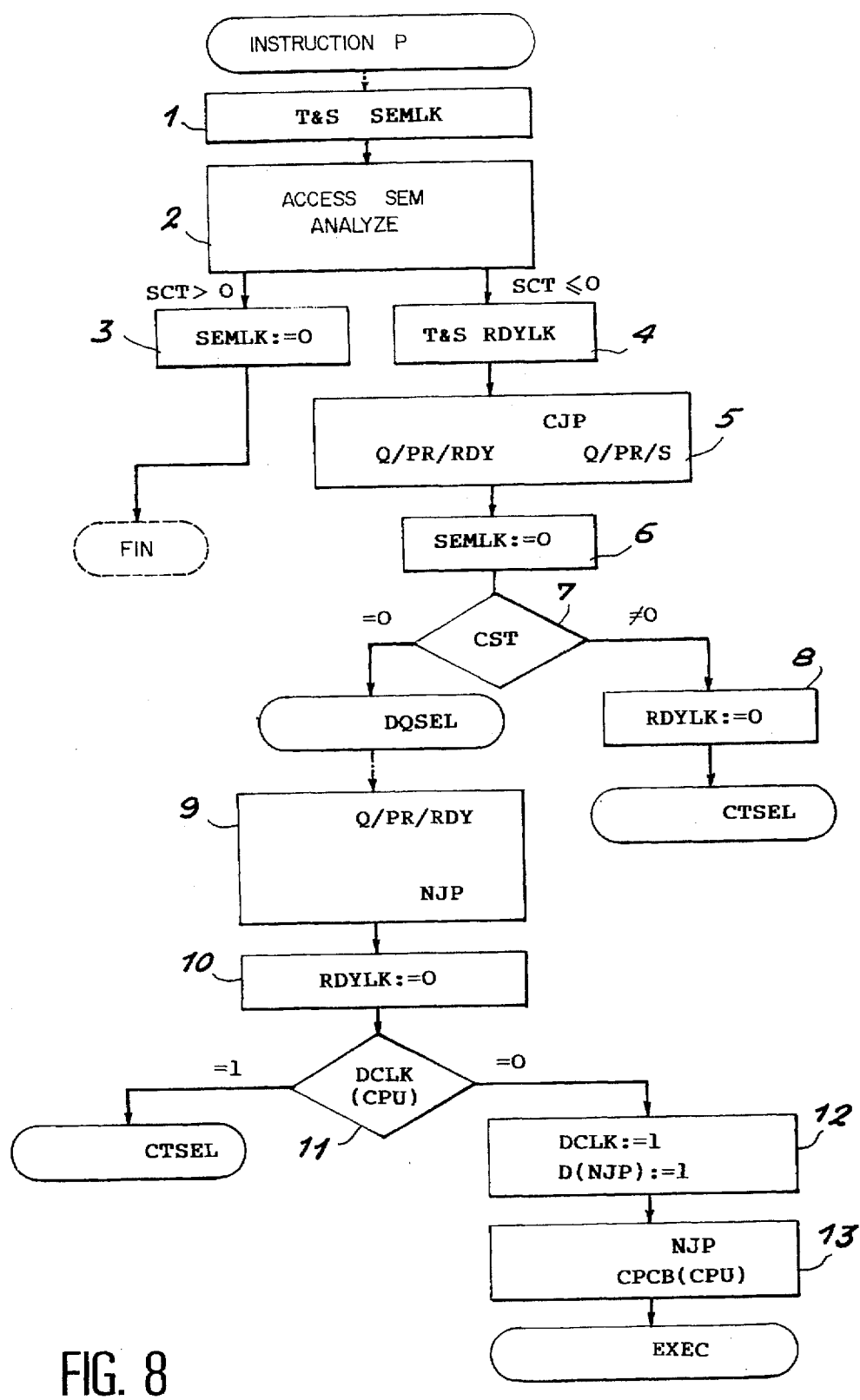
FIG. 8 is a flowchart showing the execution of a p-type instruction by semaphore.

The flowchart of FIG. 8 shows the operations triggered by a P-type instruction executed by the processor CPU. We recall that the appearance of a P instruction in a processor means that the process containing this instruction must verify whether an event associated with a particular semaphore has occurred or whether a message has been sent, before it can continue its execution. The execution of the instruction P corresponds to the execution of a corresponding microprogram that will now be explained.

Step 1 is a "TEST AND SET" operation of the lock SEMLK associated with the semaphore identified in the instruction P. We recall that this operation, known per se, here consists in accessing the lock SEMLK contained in the system control block SCB. If the lock is free (SEMLK=0), then the lock is put in the occupied state (SEMLK:=1) and the microprogram continues. Contrarily, if the lock is engaged (SEMLK=1) the microprogram goes on standby until the lock is freed.

The next step 2 consists in accessing the semaphore SEM, analyzing its contents, and proceeding to update it; which consists in particular in decrementing the count SCT by one unit. If the count SCT was positive, this means that notification of the event or the message requested by the process has already been given. In that case, the lock SEMLK is freed in step 3 (SEMLK:=0), and the next instruction of the process can generally be executed. It should be noted that if the semaphore is of the type with message, updating the semaphore will also consist in removing one message link from the message queue. Moreover, the contents of the message will be loaded into the working registers of the processor. In particular cases, it is also possible that the operation may bring about the freeing of a process waiting for a free message link, in which case the microprogram calls on a specialized module to handle this situation.

If the count SCT was negative or zero, the execution of the process must be interrupted. A TEST AND SET operation of the lock RDYLK is already done in step 4, and then in step 5, the process link CJP being run is displaced from the queue Q/PR/RDY to the queue Q/PR/S associated with the semaphore SEM. The lock SEMLK is then freed in step 6, and then in step 7, the field CST of the block SCB is tested. If CST differs from zero, this means that processes with constraints exist. The microprogram then jumps to the central module CTSEL, after having freed the lock RDYLK in step 8. The module CTSEL may be embodied in accordance with the aforementioned French Patent Application, Serial No. 90.06948.

If the counter CST is zero, the microprogram calls on the specialized module DQSEL to make the selection of a new process NJP in the case of a withdrawal of a process from the queue of ready processes Q/PR/RDY.

The execution of the module DQSEL begins with step 9, which proceeds to access the ready process queue Q/PR/RDY and analyze it. This analysis consists essentially in selecting the one of the ready processes NJP in the queue Q/PR/RDY (which is assumed not to be empty) that has to change to the active state. The lock RDYLK is then freed in step 10.

The next step 11 consists in testing the mailbox lock DCLK contained in the processor control block CPCB of the processor executing DQSEL. If the lock DCLK is engaged (DCLK=1), this means that a dialog between processors is already in progress, and that a conflict in dispatching consequently exists. The microprogram then calls on the centralized module CTSEL.

Contrarily, if the lock DCLK is free (DCLK=0), the microprogram takes this lock to step 12 (DCLK: =1) and forces the bit D of the link associated with the process NJP to one. Step 13 then ensues, with the inscription of the selected process number NJP in the corresponding field of the block CPCB. Step 13 sends with the call to the module EXEC, which will now be described with reference to FIG. 9.

Figure 9:
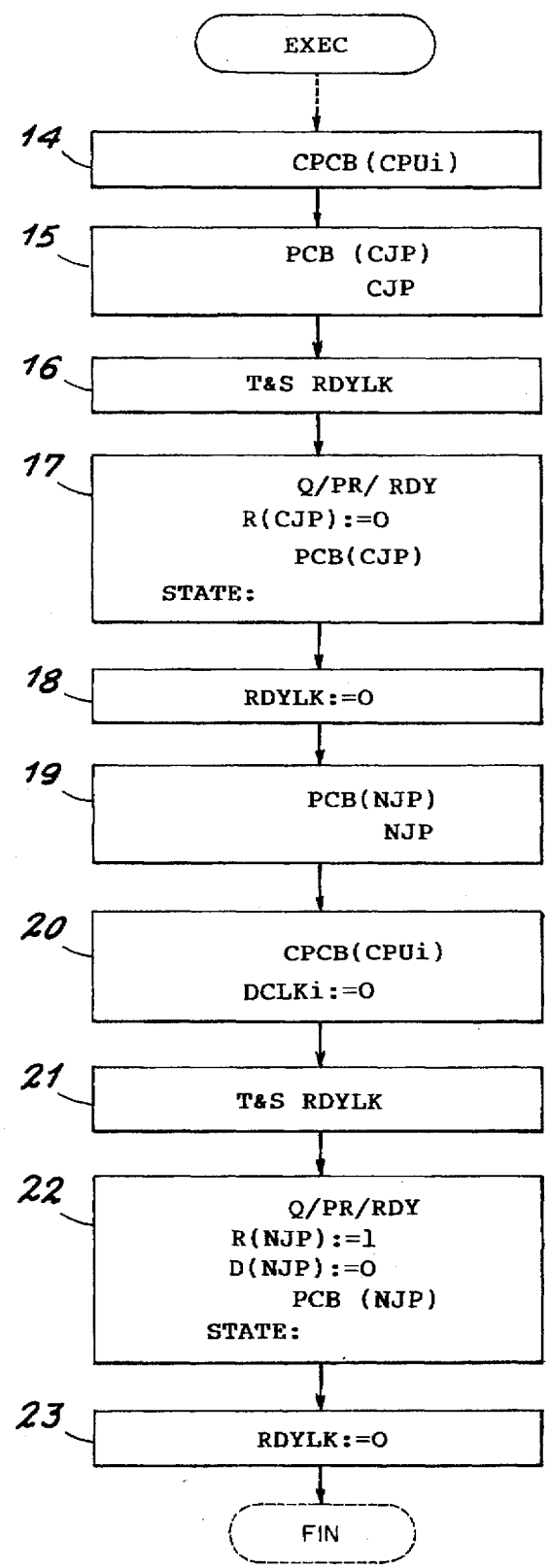
FIG. 9 is a flowchart for the microprogram EXEC.

The flowchart of FIG. 9 shows the general case of any arbitrary processor CPUi executing the module EXEC. It is understood that when this module is called by an operation DQSEL executed by the processor CPU, it will be executed by the same processor; then, CPUi=CPU.

The module EXEC begins in step 14 with an access to the processor control block CPCB of the processor CPUi in order to take into account the number of the process NJP to be executed. Then in step 15, it accesses the process control block PCB of the process CPJ in progress in CPUi in order to save the context of this process. Next, in step 16, it performs a TEST AND SET operation of the lock RDYLK, and then in step 17, it accesses the queue Q/PR/RDY to update it, which consists in setting the bit R of the process link CJP to zero. It also accesses the block PCP of CJP in order to put the field STATE in the "ready, nonactive" state". The lock RDYLK is then freed in step 18. In step 19, the process control block PCB of the selected process NJP is accessed to load the context of this process into the registers of the processor. In step 20, the block CPCB of the processor CPUi is accessed to free its lock DCLKi. A TEST AND SET operation of the lock RDYLK is again performed in step 21, and then the queue Q/PR/RDY is again accessed in step 22 for updating of the field TEN and to set the bits R and D of the process link NJP to 1 and 0, respectively. In addition, the field STATE of the block PCB of NJP is put in the "active" state. After this operation, the lock RDYLK is again freed in step 23.

Figure 10:
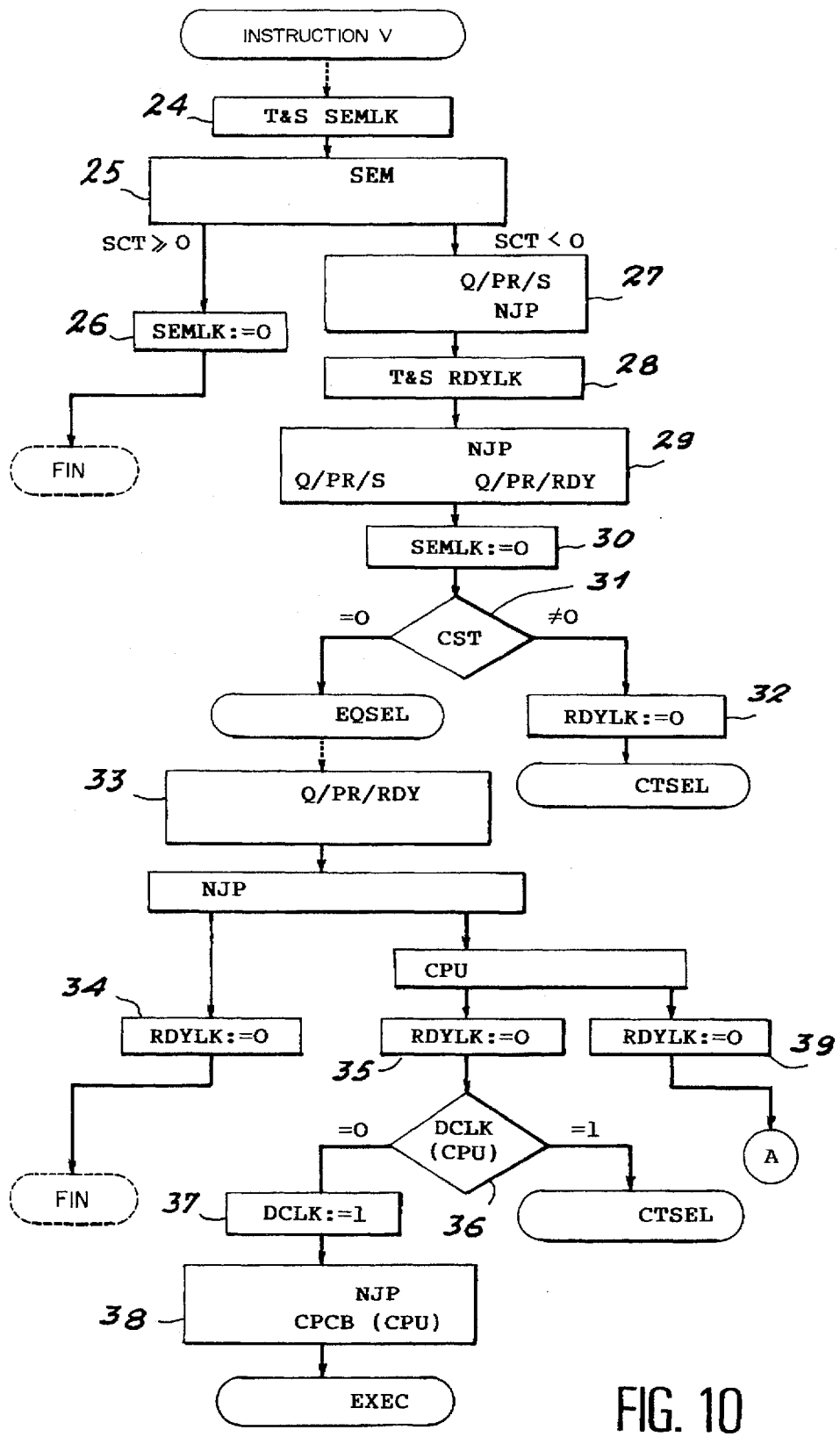
FIGS. 10 and 11 show a flowchart of V-type operation by semaphore.

The operations triggered by a V-type instruction are shown in the flowchart of FIG. 10. A V instruction is the instruction that is complementary to a P instruction. It means that the process containing this instruction gives notice of an event or message to a particular semaphore.

The microprogram for executing a V instruction begins in step 24 with a TEST AND SET operation on the lock SEMLK associated with the semaphore SEM identified in the instruction V. The step 25 consists in accessing the semaphore, analyzing its contents, and updating it, which consists in particular in incrementing the count SCT by one unit. If the count SCT was positive or zero, that means that no process is waiting for the event or message of which notification is given with the instruction V. In that case, the lock SEMLK is freed in step 26, and the next instruction of the process can be executed normally. If the semaphore is the type with message, updating the semaphore will then also consist in adding a message link to the message queue. In the particular case where there is no longer any free message link, the microprogram calls on a specialized module, not described, to handle this situation.

If the count SCT was negative, this means that at least one process is waiting for the event or message in the queue Q/PR/S associated with the semaphore. The queue Q/PR/S is then analyzed in step 27, to select the process NJP that must be removed from this queue and placed in the queue Q/PR/RDY of ready processes. To that end, a TEST AND SET operation on the lock RDYLK is performed in step 28, and then in the course of step 29, the selected process link NJP is shifted from the queue Q/PR/S to the queue Q/PR/RDY. The lock SEMLK is then freed in step 30.

The counter CST is then tested in step 31. If CST differs from zero, the microprogram jumps to the centralized module CTSEL. Contrarily, if the counter CST is zero, the microprogram calls on the specialized module EQSEL to handle the situation of an addition of a process to the queue Q/PR/RDY of ready processes.

The execution of the module EQSEL begins with step 33, which proceeds to access the queue Q/PR/RDY of ready processes with a view to determining whether the new process NJP must become active, and if so, to select which of the processors CPU, CPUi should execute it. This operation may then be quite simple, if a pointer has been provided to the link of the last active process having the lowest priority. In that case, it suffices to compare the priority level of NJP with that of the process designated by the pointer. If NJP has an equal or lower priority, it will not be selected. Contrarily, if NJP has a higher priority, it must replace this process whose link, by its field TEN, indicates the processor in question.

If the process NJP is not selected, the operation ends with the freeing of the lock RDYLK in step 34.

Contrarily, if the process NJP is selected, one of the processors CPU, CPUi of the system will have to interrupt the execution of its process in progress in order to replace it with the selected process NJP. If the processor is selected is the processor CPU that executes the module EQSEL, then the operation continues with the freeing of the lock RDYLK in step 35, and then with the test of the lock DCLK of the mailbox of the processor CPU in step 36. If the lock is engaged, the microprogram jumps to the central module CTSEL. Contrarily, if the lock DCLK is free, the microprogram engages this lock in step 37 and then proceeds in step 38 to inscribing the number of the process selected NJP in the corresponding field of the block CPCB of the processor CPU. Step 38 ends with the call to the module EXEC, which has been described in conjunction with FIG. 9.

Figure 11:
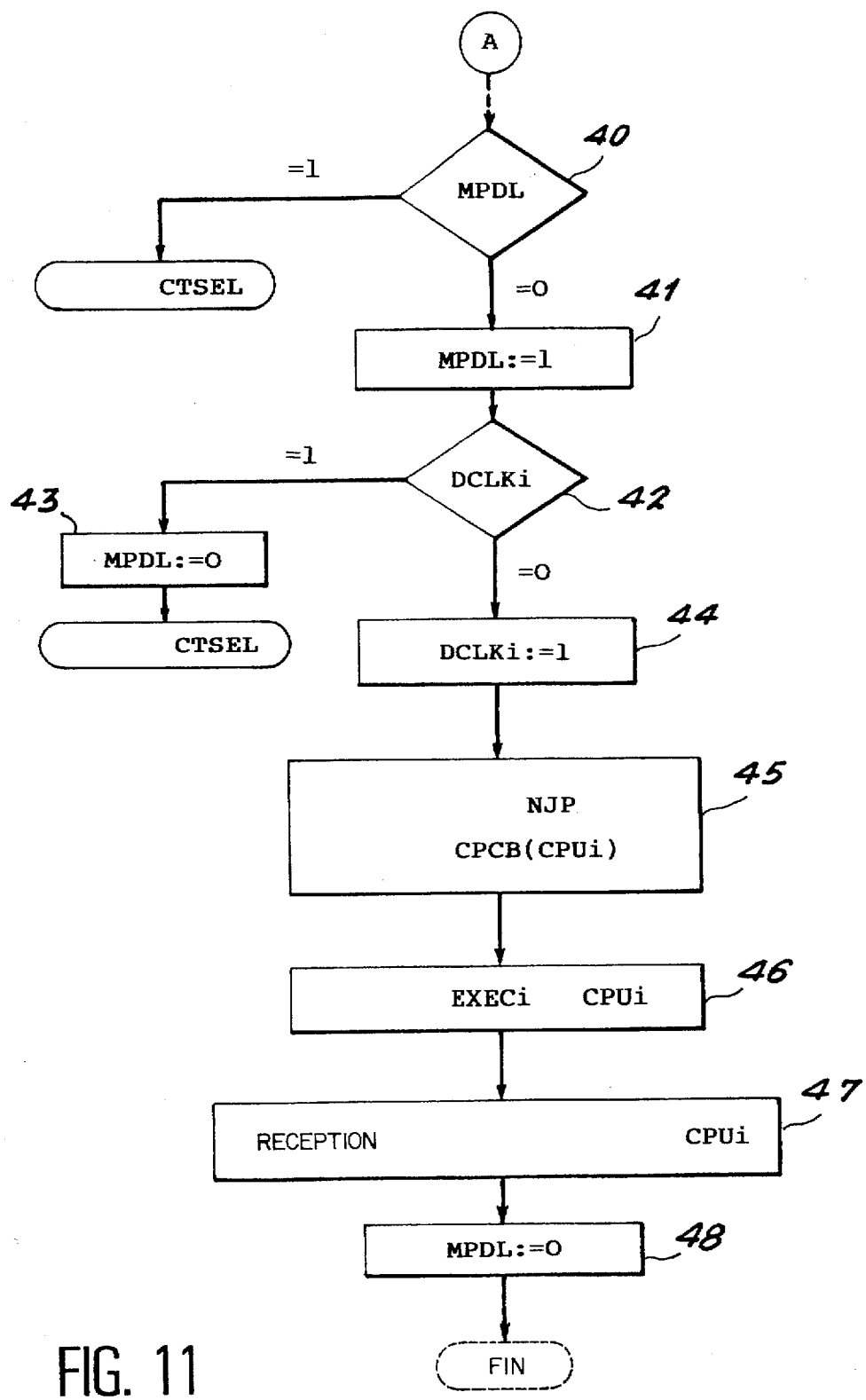

If the analysis done in step 33 leads to selecting a different processor CPUi, the lock RDYLK is freed in step 39, and the microprogram continues with the operations A shown in FIG. 11.

The next step 40 performs the test of the dialog lock MPDL. If this lock is engaged, the microprogram jumps to the central module CTSEL. Contrarily, if MPDL is free, the microprogram engages this lock in step 41. Next, in step 42, it tests the mailbox lock DCLKi of the processor CPUi selected. If the lock DCLKi is engaged, the microprogram jumps to the central module CTSEL, after having freed MPDL in step 43. Contrarily, if DCLKi is free, then it engages the lock in step 44. It then proceeds in step 45 with the inscription of the number of the process selected NJP in the corresponding field of the block CPCB of the processor selected CPUi.

The microprogram then, in step 46, uses the means for dialog among processors, by sending an interruption EXECi to the processor CPUi. Next, in step 47, the microprogram enters a wait state for the acknowledgement that must be sent by the processor CPUi. Once this acknowledgement has been received, the dialog lock MPDL is freed in step 48, which ends the operation. The processor can then continue the execution of the process that has been assigned to it.

Sending the interruption EXECi to the processor CPUi in step 46 has the effect, in this processor, of activating the interruption manager, which then proceeds to call the module EXEC already described with reference to FIG. 9. Hence it is only in the course of execution of this module in step 20 that the mailbox lock DCLKi will be freed.

In an important feature of the embodiment, provision is made that the call to the module EXEC in a processor by this same processor (steps 13 in FIG. 8 and 38 in FIG. 10) is done by the general mechanism of interruption described in the aforementioned French Patent Application Serial No. 90.06948, which enables a processor to notify itself of messages. It is understood that in such a case, the dialog lock MPDL is not involved.

To further optimize the operation, provision may be made for the field CST of the block SCB to include a conflict indicator, which is put in a state different from 0 each time a conflict is detected in the course of tests of the locks DCLK and MPDL (steps 11, 37, 40). Hence the test of CST (steps 7, 31) will recognize the existence of any conflict between dispatching operations very quickly.

The detailed descriptions of the operations P and V by semaphore given above shows how the specialized modules EQSEL and DQSEL are used in cooperation with the central module CTSEL to enable distributed execution of the dispatching, with increased possibilities for parallelism. It may be noted in particular that a plurality of processors can execute certain phases of different dispatching operations simultaneously, the only constraint being the interdiction of simultaneous access to certain shared resources (semaphores, queue Q/PR/RDY, dialog mechanism, mailboxes). These interdictions are assured very simply by means of locks associated with these resources and thus guarantee the integrity of the system.

Naturally, the modules EQSEL and DQSEL can also intervene in response to other instructions than the instructions P and V. This is the case in particular for the instruction START, the function of which is to introduce a new process to the system.

In accordance with the invention, other specialized modules may also be provided, which will be selected as a function of the context of system operation. For example, a module CHSELK may be provided to respond to the case where an instruction commands the shift of a process link to the queue Q/PR/RDY. This is the case, for example, for the instruction CHOP, which modifies the priority level of the process which contains it, or the instruction RLQ, which results in yielding the right to execution of the process.

The microprograms handling these other cases may be embodied by making use of the detailed description of the modules EQSEL and DQSEL given above. One skilled in the art can make these embodiments on his own and does not require additional explanation.

I claim:

1. A multiprocessor information processing system, having a plurality of processors (CPU), each having microprogrammed means (CP) for performing dispatching of processes (JP) to the processors (CPU) of the system, means for activating said microprogrammed means (CP) in one of said processors (CPU) in response to an event detected by said processor (CPU) for causing a modification in selecting processes (JP) to be run and of processors (CPU) that run said processes, said microprogrammed means (CP) including at least one specialized microprogram module means (CHSEL, DQSEL, EQSEL) for determining said dispatching in response to a category of particular events by use of a pointer to a link of a last active process having a lowest priority, and central microprogram module means (CTSEL) for determining said dispatching for events other than those processed by said specialized microprogram module means (CHSEL, DQSEL, EQSEL).

2. The system of claim 1, wherein each category of particular events includes events among those that have a strongest probability of occurring in the course of system operation.

3. The system of claim 2, wherein each category of particular events includes events that cause simple modifications in the selection of processes (JP) that are to be run and processors (CPU) that run them.

4. The system of claim 3, including means for memorizing the identity of the processes (JP) that can be run in the system either in a queue (Q/PR/S) of the processes waiting for an event, or in at least one queue (Q/PR/RDY) of ready processes including active processes in a processor or processes waiting for a processor, said category of particular events including events causing an addition, subtraction or displacement, respectively of a single process (JP) in the queue (Q/PR/RDY) of ready processes.

5. The system of claim 4, including first lock means (RDYLK) associated with the queue (Q/PR/RDY) of ready processes, said first lock means (RDYLK) being used by said microprogrammed means (CP) to assure that only one processor (CPU) at a time can modify the queue (Q/PR/RDY) of ready processes.

6. The system of claim 4, including at least one second lock means (SEMLK) associated with the queues (Q/PR/S), said at least one second lock means (SEMLK) being used by said microprogrammed means (CP) to assure that only one processor (CPU) at a time can modify the queue (Q/PR/S) of the waiting processes.

7. The system of claim 5, including at least one second lock means (SEMLK) associated with the queues (Q/PR/S) of the processes waiting for an event, said at least one second lock means (SEMLK) being used by said microprogrammed means (CP) to assure that only one processor (CPU) at a time can modify the queue (Q/PR/S) of the waiting processes.

8. The system of claim 2, wherein said specialized module means (CHSEL, DQSEL, EQSEL) include a plurality of modules for making a call to said central microgrogrammed module means (CTSEL).

9. The system of claim 1, wherein said specialized module means (CHSEL, DQSEL, EQSEL) are operable to make a call to said central microprogrammed module means (CTSEL).

10. The system of claim 9, further including dialog means for dialog between processes used by said microprogrammed means (CP) of a processor (CPU) in order to issue requests (EXECi) notifying other processors (CPUi) of the identity of new processes (NJP) to be run, and said dialog means are associated with a first dialog lock (MPDL) used by said microprogrammed means (CP) to assure that only one processor (CPU) at a time will issue said requests (EXECi) and that each specialized microprogrammed module means is constructed and arranged so as to stop execution and make a call to said central microprogrammed module means (CTSEL) in the event that execution of said specialized microprogrammed module means (CHSEL, DQSEL, EQSEL) involves a dialog while said first lock (MPDL) is engaged.

11. The system of claim 10, wherein said dialog means include a mailbox (CPCB) associated with each processor (CPU) and adapted to be used by said microprogrammed means (CP) to transmit said requests (EXECi), that each mailbox (CPCB) is associated with a second lock (DCLK), which is put in an occupied state by the processor (CPU) issuing requests (EXECi) and is unlocked by the processor (CPUi) after execution of the request that was addressed thereto and that each specialized microprogrammed module means is constructed and arranged so as to stop execution and to make the call to said central module (CTSEL) in the event that the execution of said specialized microprogrammed module means (CHSEL, DQSEL, EQSEL) involves sending of a request (EXECi) to a processor (CPUi) while the second lock (DCLK) thereof is engaged.

12. The system of claim 1, further including a constraint indicator (CST), whose state is indicative of an existence in the system of processes (JP) with constraints, and that said microprogrammed means (CP) are constructed and arranged such that the dispatching of the processes (JP) to the processors (CPU) is effected by said central microprogrammed module means (CTSEL) when said constraint indicator (CST) signals the existence of constraints.

13. The system of claim 1, wherein there is a plurality of categories of events and each category of particular events includes events that cause simple modifications in the selection of processes (JP) that are to be run and processors (CPU) that run them.

14. The system of claim 13, including means for memorizing the identity of the processes (JP) that can be run in the system either in a queue (Q/PR/S) of the processes waiting for an event, or in at least one queue (Q/PR/RDY) of ready processes including active processes in a processor and processes waiting for a processor, said category of particular events including events causing an addition, subtraction or displacement, respectively of a single process (JP) in the queue (Q/PR/RDY) of ready processes.

15. The system of claim 14, including first lock means (RDYLK) associated with the queue (Q/PR/RDY) of ready processes, said first lock means (RDYLK) being used by said microprogrammed means (CP) to assure that only one processor (CPU) at a time can modify the queue (Q/PR/RDY) of ready processes.

16. The system of claim 14, including at least one second lock means (SEMLK) associated with the queues (Q/PR/S) of the processes waiting for an event, said at least one second lock means (SEMLK) being used by said microprogrammed means (CP) to assure that only one processor (CPU) at a time can modify the queue (Q/PR/S) of the waiting processes.

17. The system of claim 14, wherein said specialized module means (CHSEL, DQSEL, EQSEL) include a plurality of modules operable to make a call to said central microprogrammed module means (CTSEL).

18. The system of claim 15, wherein said specialized module means (CHSEL, DQSEL, EQSEL) include a plurality of modules for making a call to said central microprogrammed module means (CTSEL).

19. The system of claim 16, wherein said specialized module means (CHSEL, DQSEL, EQSEL) include a plurality of modules for making a call to said central microprogrammed module means (CTSEL).

20. The system of claim 13, wherein said specialized module means (CHSEL, DQSEL, EQSEL) include a plurality of modules for making a call to said central microprogrammed module means (CTSEL).

* * * * *

UNITED STATES PATENT AND TRADEMARK OFFICE
CERTIFICATE OF CORRECTION

PATENT NO. : 5,745,757
DATED : April 28, 1998
INVENTOR(S) : Geroges LECOURTIER

It is certified that error appears in the above-indentified patent and that said Letters Patent is hereby corrected as shown below:

In Claim 4, column 12, line 13, "or" should read --and--.

Signed and Sealed this

First Day of September, 1998

*Attest:*

BRUCE LEHMAN

*Attesting Officer*     Commissioner of Patents and Trademarks